(12) United States Patent
Arai (10) Patent No.: US 9,151,014 B2
(45) Date of Patent: Oct. 6, 2015

(54) WORK VEHICLE

(71) Applicant: KOMATSU LTD., Tokyo (JP)

(72) Inventor: Yuki Arai, Komatsu (JP)

(73) Assignee: KOMATSU LTD., Tokyo (JP)

( * ) Notice: Subject to any disclaimer, the term of this patent is extended or adjusted under 35 U.S.C. 154(b) by 77 days.

(21) Appl. No.: 14/125,492

(22) PCT Filed: Dec. 27, 2012

(86) PCT No.: PCT/JP2012/083780
§ 371 (c)(1),
(2) Date: Dec. 11, 2013

(87) PCT Pub. No.: WO2014/097497
PCT Pub. Date: Jun. 26, 2014

(65) Prior Publication Data
US 2015/0136514 A1   May 21, 2015

(30) Foreign Application Priority Data

Dec. 20, 2012  (JP) ................................. 2012-278011

(51) Int. Cl.
*B60K 15/063* (2006.01)
*E02F 9/08* (2006.01)
(Continued)

(52) U.S. Cl.
CPC ............... *E02F 9/0866* (2013.01); *B60K 13/04* (2013.01); *B60K 15/063* (2013.01); *E02F 3/764* (2013.01);
(Continued)

(58) Field of Classification Search
CPC ......... E02F 9/00; E02F 9/0866; E02F 9/0833; E02F 9/0891; B60K 15/063; B60K 15/073; B60K 15/04; B60K 15/05; B60K 2015/03328; B60K 2015/0474; B60K 2015/0638; F01N 3/08; F01N 3/2066; F01N 2610/02; F01N 2610/1406; F01N 2610/1413; F01N 2590/08; B60Y 2200/411
See application file for complete search history.

(56) References Cited

U.S. PATENT DOCUMENTS

| 8,056,671 | B2 * | 11/2011 | Ikegami et al. | ............... 180/309 |
| 8,915,328 | B2 * | 12/2014 | Okada | ........................... 180/309 |
| 2010/0018732 | A1 * | 1/2010 | Daniel et al. | .................. 172/781 |
| 2011/0114636 | A1 * | 5/2011 | Erckert et al. | ............... 220/86.2 |

FOREIGN PATENT DOCUMENTS

CN    201800534 U    4/2011
JP    2011-529538 A   12/2011
(Continued)

OTHER PUBLICATIONS

Cummins Filtration, Diesel Exhaust Fluid (DEF) Q & A, copyright 2009, bottom of p. 5 discussing relative size of DEF inlets to fuel inlets and SCR systems detection of non-DEF fluids in tank.*

(Continued)

*Primary Examiner* — Paul N Dickson
*Assistant Examiner* — Steve Clemmons
(74) *Attorney, Agent, or Firm* — Global IP Counselors, LLP (57) ABSTRACT

A work vehicle includes an engine, a selective catalytic reduction apparatus, a fuel tank, and a reducing agent tank. The selective catalytic reduction apparatus treats exhaust from the engine. The fuel tank includes a fuel tank body retaining fuel and a fuel supply port which supplies fuel to the fuel tank body. The reducing agent tank includes a reducing agent tank body retaining a reducing agent used in the selective catalytic reduction apparatus and a reducing agent supply port which supplies the reducing agent to the reducing agent tank body. The fuel supply port protrudes from the fuel tank body toward a first direction left or right with respect to a center axis line in the front and back direction of the vehicle. The reducing agent supply port protrudes from the reducing agent tank body toward a second direction opposite to the first direction.

19 Claims, 7 Drawing Sheets

(51) Int. Cl.
*E02F 3/76* (2006.01)
*B60K 13/04* (2006.01)
*E02F 9/26* (2006.01)
*F01N 3/20* (2006.01)

(52) U.S. Cl.
CPC ............... *E02F 3/765* (2013.01); *E02F 3/7645* (2013.01); *E02F 3/7654* (2013.01); *E02F 9/0883* (2013.01); *E02F 9/0891* (2013.01); *E02F 9/26* (2013.01); *F01N 3/2066* (2013.01); *B60K 2015/0634* (2013.01); *B60K 2015/0636* (2013.01); *B60K 2015/0638* (2013.01); *B60Y 2200/411* (2013.01); *F01N 2610/02* (2013.01); *F01N 2610/1413* (2013.01)

(56) References Cited

FOREIGN PATENT DOCUMENTS

| | | |
|---|---|---|
| JP | 2012-97413 A | 5/2012 |
| WO | WO 2006098078 A1 * | 9/2006 |
| WO | WO 2011027765 A1 * | 3/2011 |
| WO | 2011/152306 A1 | 12/2011 |

OTHER PUBLICATIONS

International Search Report for PCT/JP2012/083780, Issued on Apr. 16, 2013.
The Office Action for the corresponding Chinese application No. 201280029144.9, issued on Dec. 29, 2014.

* cited by examiner

WORK VEHICLE

CROSS-REFERENCE TO RELATED APPLICATIONS

This application is a U.S. National stage application of International Application No. PCT/JP2012/083780 filed on Dec. 27, 2012, claiming priority to Japanese Patent Application No. 2012-278011 filed on Dec. 20, 2012, the disclosure of which is hereby incorporated herein by reference in its entirety.

BACKGROUND

The present invention relates to a work vehicle which is provided with a working implement.

A post-treatment apparatus which treats exhaust from an engine is mounted in a work vehicle such as a motor grader (refer to Japanese Laid-Open Patent Application Publication No. 2011-529538). The post-treatment apparatus is connected to the engine through a connecting pipe. It is preferable that the post-treatment apparatus include a diesel particulate filter (DPF) apparatus and a selective catalytic reduction (SCR) apparatus (refer to Japanese Laid-Open Patent Application Publication No. 2012-097413). The DPF apparatus reduces particulate matter in the exhaust. The SCR apparatus reduces nitrogen oxide (NOx) in the exhaust.

SUMMARY

In order to utilize a SCR apparatus, a reducing agent is supplied to the SCR apparatus. In order to achieve this, a work vehicle is provided with a reducing agent tank for retaining a reducing agent in addition to a fuel tank. Accordingly, it is important that it is possible for a user to clearly distinguish between a fuel supply port of the fuel tank and a reducing agent supply port of the reducing agent tank.

A work vehicle according to an aspect of the present invention is provided a with an engine, a selective catalytic reduction apparatus, a fuel tank, and a reducing agent tank. The selective catalytic reduction apparatus treats exhaust from the engine. The fuel tank includes a fuel tank body for retaining fuel and a fuel supply port which supplies fuel to the fuel tank body. The reducing agent tank includes a reducing agent tank body for retaining a reducing agent used in the selective catalytic reduction apparatus and a reducing agent supply port which supplies the reducing agent to the reducing agent tank body. The fuel supply port protrudes from the fuel tank body toward a first direction which is a direction to either the left or right with regard to a center axis line in the front and back direction of the vehicle. The reducing agent supply port protrudes from the reducing agent tank body toward a second direction which is a direction opposite to the first direction with regard to the center axis line in the front and back direction of the vehicle.

The diameter of the fuel supply port can be larger than the diameter of the reducing agent supply port.

The fuel supply port and the reducing agent supply port can protrude so as to be as further apart in the vehicle width direction as they extend upward.

The work vehicle can be further provided with a vehicle frame. The fuel tank can be attached to the vehicle frame and extend from below the engine toward the rear of the vehicle. The reducing agent tank can be arranged to be close to the fuel tank behind the fuel tank. The reducing agent tank can be attached to the vehicle frame.

The reducing agent tank can preferably be attached to a rear edge of the vehicle frame.

The reducing agent tank can be arranged to be separated from the fuel tank.

The work vehicle can be further provided with a plurality of wheels provided on the vehicle frame. The plurality of wheels includes rearmost wheels positioned farthest to the rear. The reducing agent supply port can be positioned below the upper edge of the rearmost wheels. In addition, the reducing agent supply port may not overlap with a projection plane of the rear wheels in a side view.

The work vehicle can be further provided with a vehicle body cover which accommodates the engine and the selective catalytic reduction apparatus. Then, the reducing agent supply port can be arranged inwards with respect to the outer side surface of the vehicle body cover.

The work vehicle can be further provided with a radiator which includes a cooling fan. Then, the reducing agent supply port can be outside the rotation region of the cooling fan viewed from the rear of the vehicle.

The reducing agent tank can include a sensor, which detects whether or not liquid other than the reducing agent is retained in the reducing agent tank, inside the reducing agent tank.

Effect of the Invention

In the work vehicle according to the aspect of the present invention, the fuel supply port of the fuel tank and the reducing agent supply port of the reducing agent tank are arranged at different sides to the left and right of the work vehicle. Accordingly, it is possible for a user to clearly distinguish between the fuel supply port of the fuel tank and the reducing agent supply port of the reducing agent tank.

DETAILED DESCRIPTION OF EMBODIMENT(S)

Overall Configuration

Figure 1:
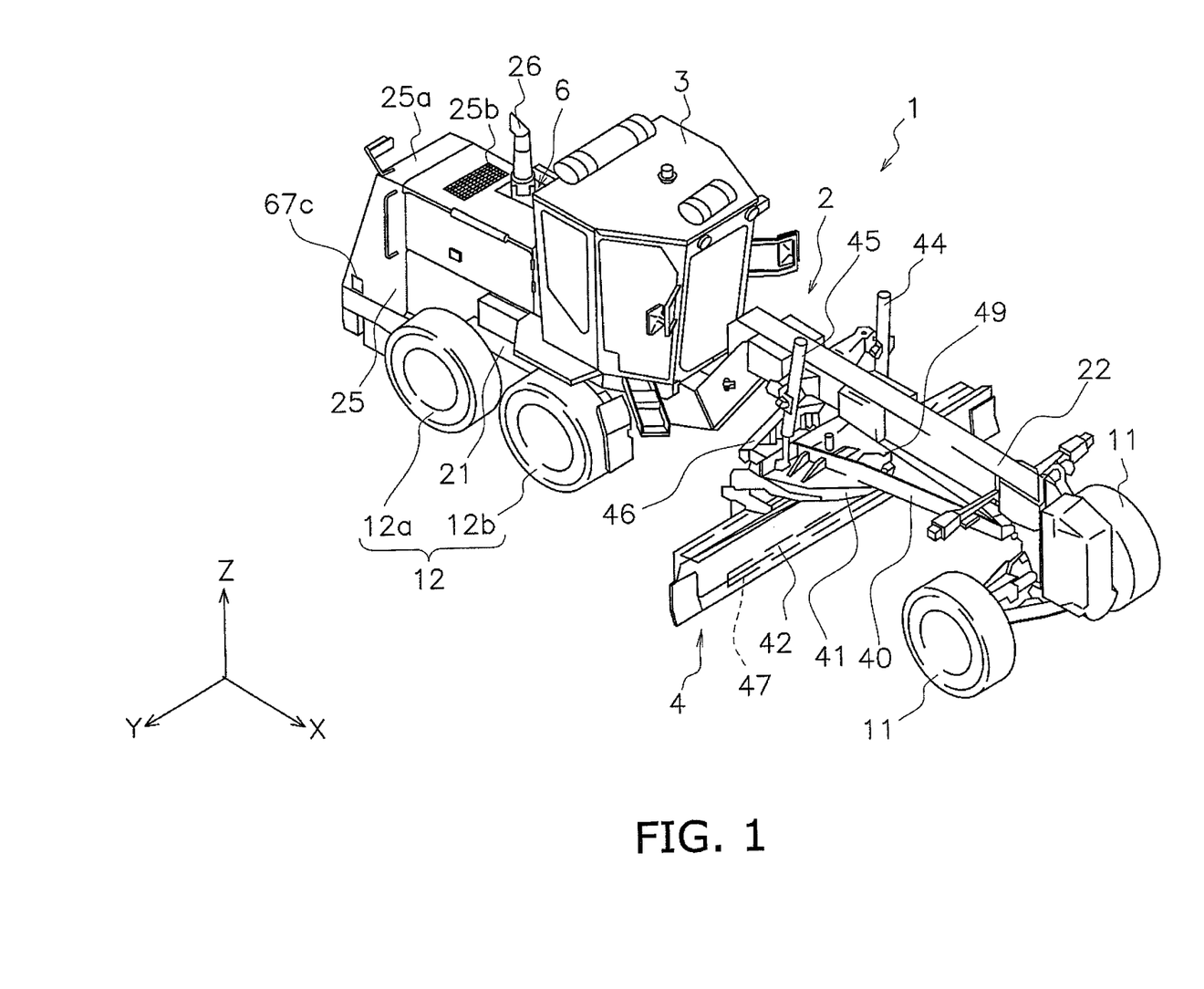
FIG. 1 illustrates a perspective view of an external appearance of a work vehicle.
Figure 2:
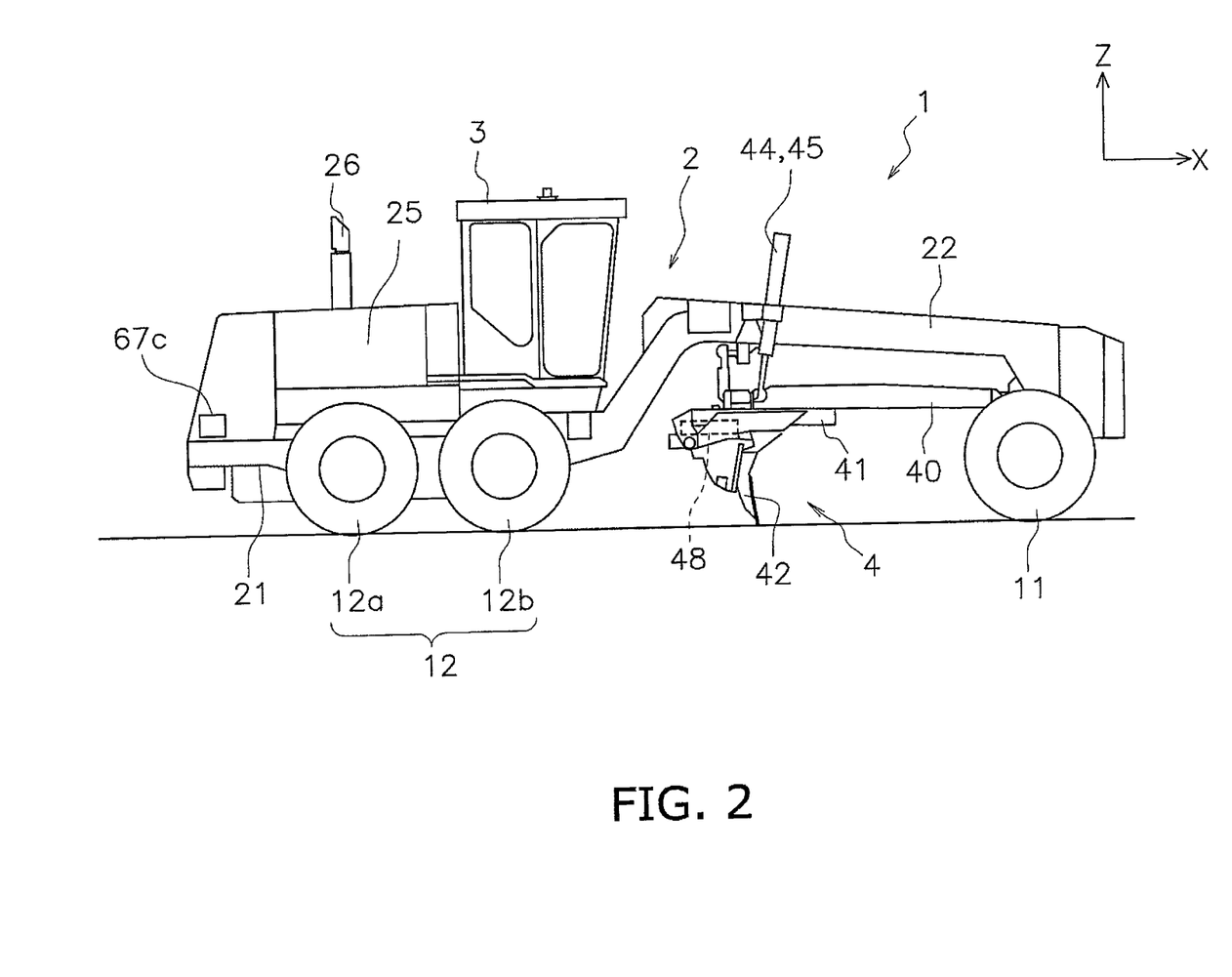
FIG. 2 illustrates a side view of a work vehicle.

FIG. 1 and FIG. 2 illustrate a perspective view and a side view of an external appearance of a work vehicle 1 according to an embodiment of the present invention. The work vehicle 1 is, for example, a motor grader. The work vehicle 1 is provided with driving wheels which include front wheels 11 and rear wheels 12. In FIG. 1 and FIG. 2, a case is illustrated where the work vehicle 1 is provided with a pair of two front wheels 11 to the left and right and four rear wheels 12 with two on each side. For convenience of description, the rear wheels positions farthest to the rear with regard to the vehicle front and back direction out of the four rear wheels 12 are referred to as rearmost wheels 12a and are distinguished from the other rear wheels 12b. However, the number and arrangement of the driving wheels are not limited to those in the above description if the work vehicle 1 includes the sufficient (multiple) number of driving wheels to realize the functions of the work vehicle 1. The work vehicle 1 can perform ground leveling work, snow removal work, light cutting, material mixing, and the like using a blade 42 provided between the front wheels 11 and the rear wheels 12. Here, in FIG. 1 and FIG. 2, out of the rear wheels 12, only the rear wheels positioned at the right side are illustrated. Here, in the following description, the front and back direction has the meaning of the front and back direction of the work vehicle 1. In other words, the front and back direction has the meaning of the front and back direction as seen by an operator who is seated in a cab 3. In addition, the left and right direction or the lateral direction has the meaning of the vehicle width direction of the work vehicle 1. In other words, the left and right direction, the vehicle width direction, or the lateral direction are the direction to the left and right as seen by the operator described above. In addition, in the diagrams, the front and back direction is shown as the X axis, the left and right direction is shown as the Y axis, and the vertical direction is shown as the Z axis.

As shown in FIGS. 1 and 2, the work vehicle 1 is provided with a vehicle frame 2, the cab 3, and a working implement 4. In addition, the work vehicle 1 is also provided with components (refer to FIG. 3 and FIG. 5) arranged in an engine compartment 6.

Vehicle Frame 2 and Cab 3

The vehicle frame 2 comprises a rear section frame 21, a front section frame 22, and an outer cover 25 as shown in FIG. 1 and FIG. 2.

The rear section frame 21 supports the outer cover 25, the components arranged in the engine compartment 6 which will be described later, and the like. The outer cover 25 covers the engine compartment 6. In addition, the rear wheels 12 which will be described later are provided in the rear section frame 21. The vehicle moves due to the rotational drive of the rear wheels 12 caused by the driving force from an engine 61 (refer to FIG. 3 and FIG. 5).

The front section frame 22 is attached to the front of the rear section frame 21. The front wheels 11 are provided on the front end section of the front section frame 22.

The cab 3 is located on the rear section frame 21. A handle, a shift lever, an operating lever for the working implement 4, a brake, an accelerator pedal, an inching pedal, and the like (which are not shown in the diagram) are provided in an inner section of the cab 3. Here, the cab 3 may be located on the front section frame 22.

The Working Implement 4

The working implement 4 includes a drawbar 40, a circle 41, the blade 42, a hydraulic motor 49, various types of hydraulic cylinders 44 to 48, and the like.

The front end section of the drawbar 40 is attached to the front end section of the front section frame 22 so as to be able to pivot. Due to the synchronized expansion and contraction of a pair of lift cylinders 44 and 45, the rear end section of the drawbar 40 is raised and lowered. In addition, the drawbar 40 swings up and down centering on an axis along the traveling direction of the vehicle due to the lift cylinders 44 and 45 expanding and contracting differently. Furthermore, the drawbar 40 moves to the left and right due to the expansion and contraction of a drawbar shift cylinder 46.

The circle 41 is attached to the rear end section of the drawbar 40 so as to be able to rotate. The circle 41 is driven by the hydraulic motor 49 (refer to FIG. 1). The circle 41 rotates in the clockwise or counterclockwise direction with regard to the drawbar 40 as seen from above the vehicle.

The blade 42 is supported so as to be able to slide in the left and right direction with regard to the circle 41 and to be able to swing up and down centering on a shaft parallel to the left and right direction. The blade 42 can move in the left and right direction with regard to the circle 41 using a blade shift cylinder 47. In addition, the blade 42 can change orientation in the up and down direction by swinging centering on a shaft parallel to the left and right direction with regard to the circle 41 using a tilt cylinder 48 (refer to FIG. 2) supported by the circle 41. The blade shift cylinder 47 and the tilt cylinder 48 are supported by the circle 41. As described above, the blade 42 can perform raising and lowering with regard to the vehicle, changing the inclination with regard to the traveling direction, changing the inclination with regard to the horizontal direction, rotating, and shifting in the left and right direction via the drawbar 40 and the circle 41.

The hydraulic motor 49 is driven to be able to rotate the circle 41 by hydraulic pressure supplied from a hydraulic pump (which is not shown in the diagram) which will be described later.

The hydraulic cylinders 44 to 48 are cylinders which are driven by hydraulic pressure supplied from the hydraulic pump. A pair of lift cylinders 44 and 45 is provided spaced apart to the left and right to interpose the front section frame 22. The lift cylinders 44 and 45 are substantially arranged along the vertical direction. The lift cylinders 44 and 45 are attached to the front section frame 22 and the drawbar 40. The lift cylinders 44 and 45 expand and contract to move the rear end section of the drawbar 40 up and down. In this way, the lift cylinders 44 and 45 can move the blade 42 in the up and down direction.

The drawbar shift cylinder 46 is arranged to be inclined with regard to the up and down direction. The drawbar shift cylinder 46 is attached to the side end section of the front section frame 22 and the drawbar 40. The drawbar shift cylinder 46 can expand and contract to change the position of the drawbar 40 with regard to the horizontal direction. In this way, the drawbar shift cylinder 46 can change the position of the blade 42.

The blade shift cylinder 47 is arranged along the longitudinal direction of the blade 42. The blade shift cylinder 47 is attached to the circle 41 and the blade 42. The blade shift cylinder 47 can expand and contract to change the position of the blade 42 in the longitudinal direction.

The tilt cylinder 48 is attached to the circle 41 and the blade 42. The tilt cylinder 48 can expand and contract to swing the blade 42 up and down centering on a shaft along the horizontal direction. In this way, the tilt cylinder 48 can change the angle of inclination of the blade 42 with regard to the traveling direction.

Internal Configuration of Engine Compartment 6

Figure 3:
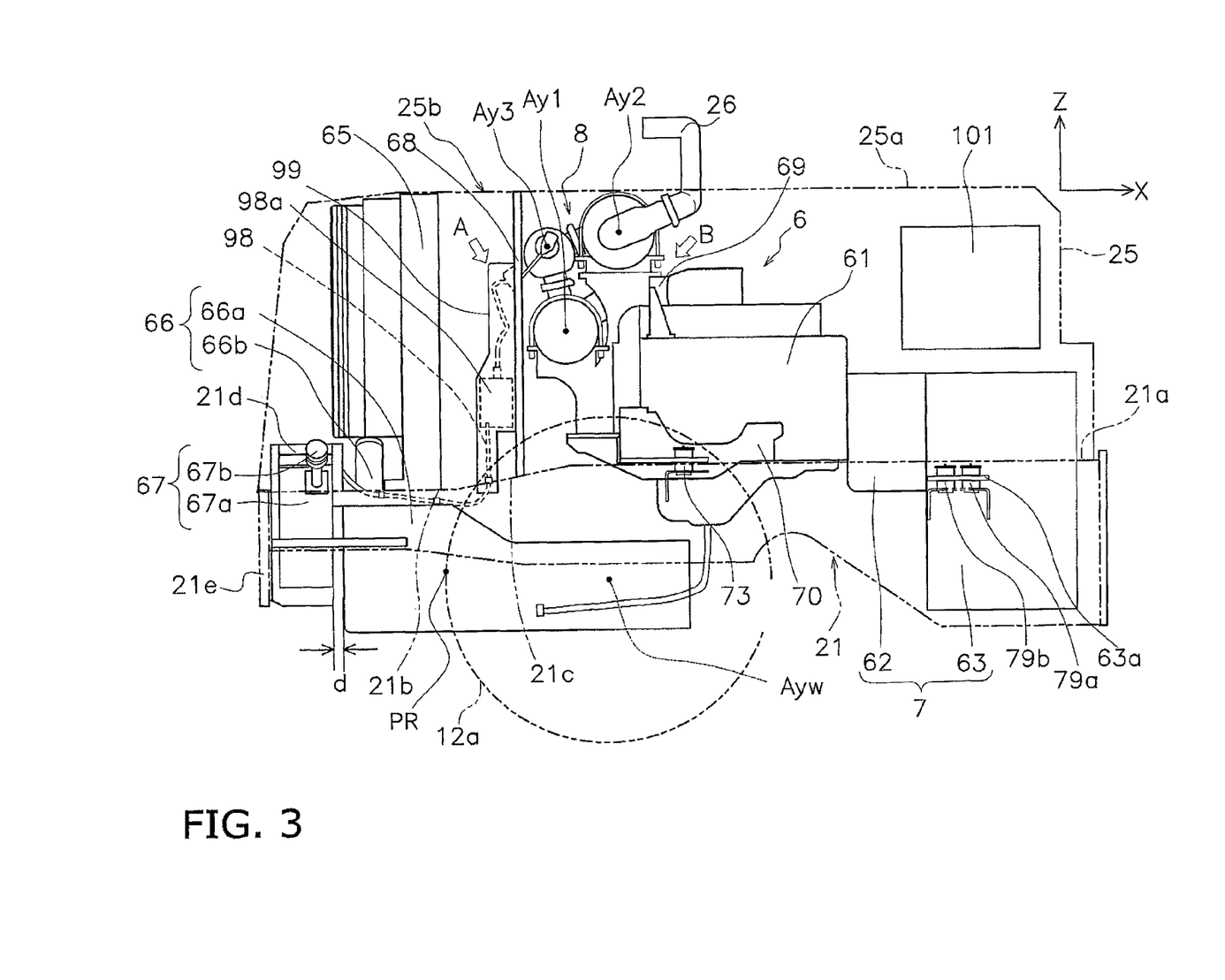
FIG. 3 illustrates a right side view of an internal configuration of an engine compartment.
Figure 4:
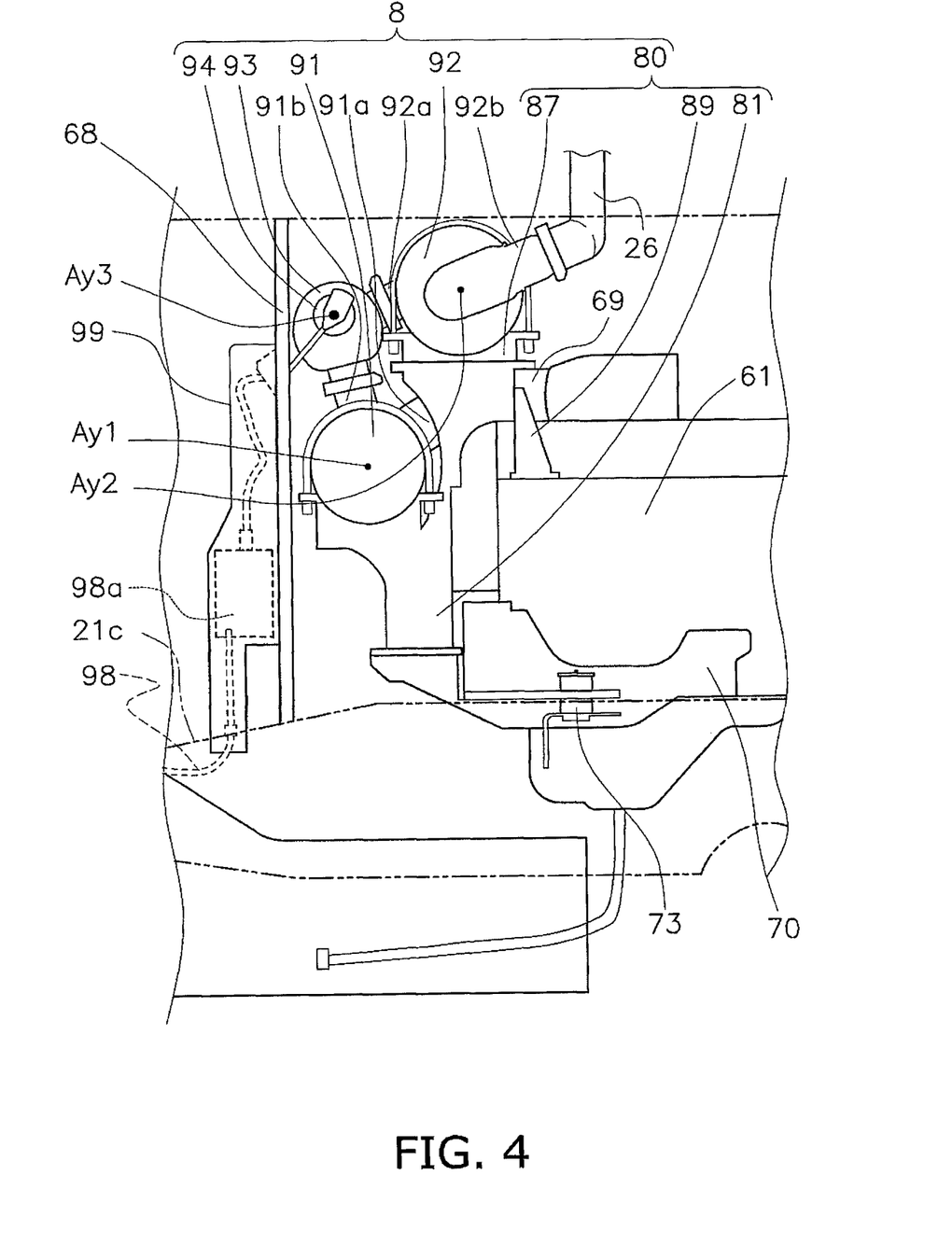
FIG. 4 illustrates an enlarged view of the vicinity of a post-treatment unit in FIG. 3.
Figure 5:
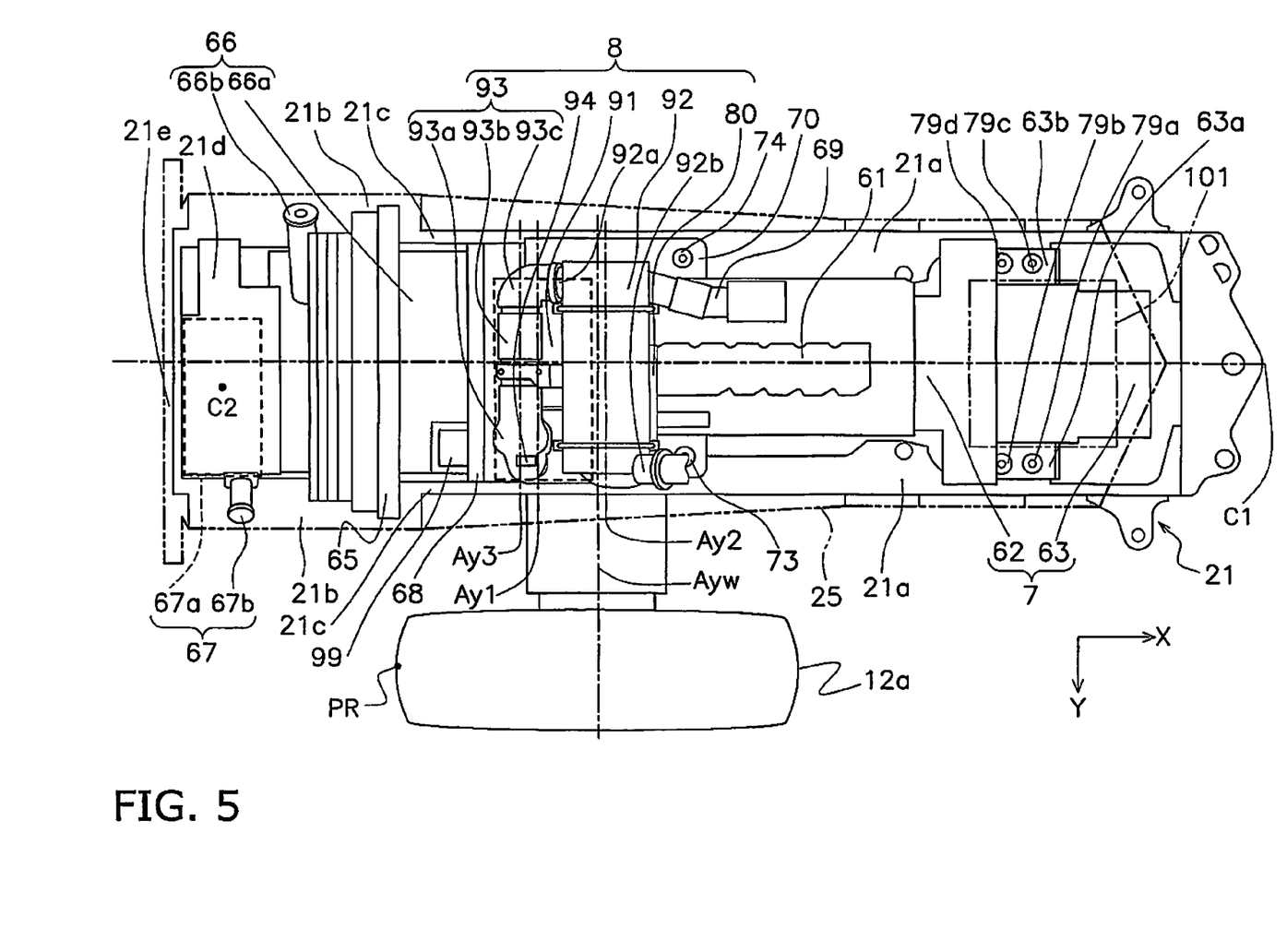
FIG. 5 illustrates a top view of an internal configuration of an engine compartment.
Figure 6:
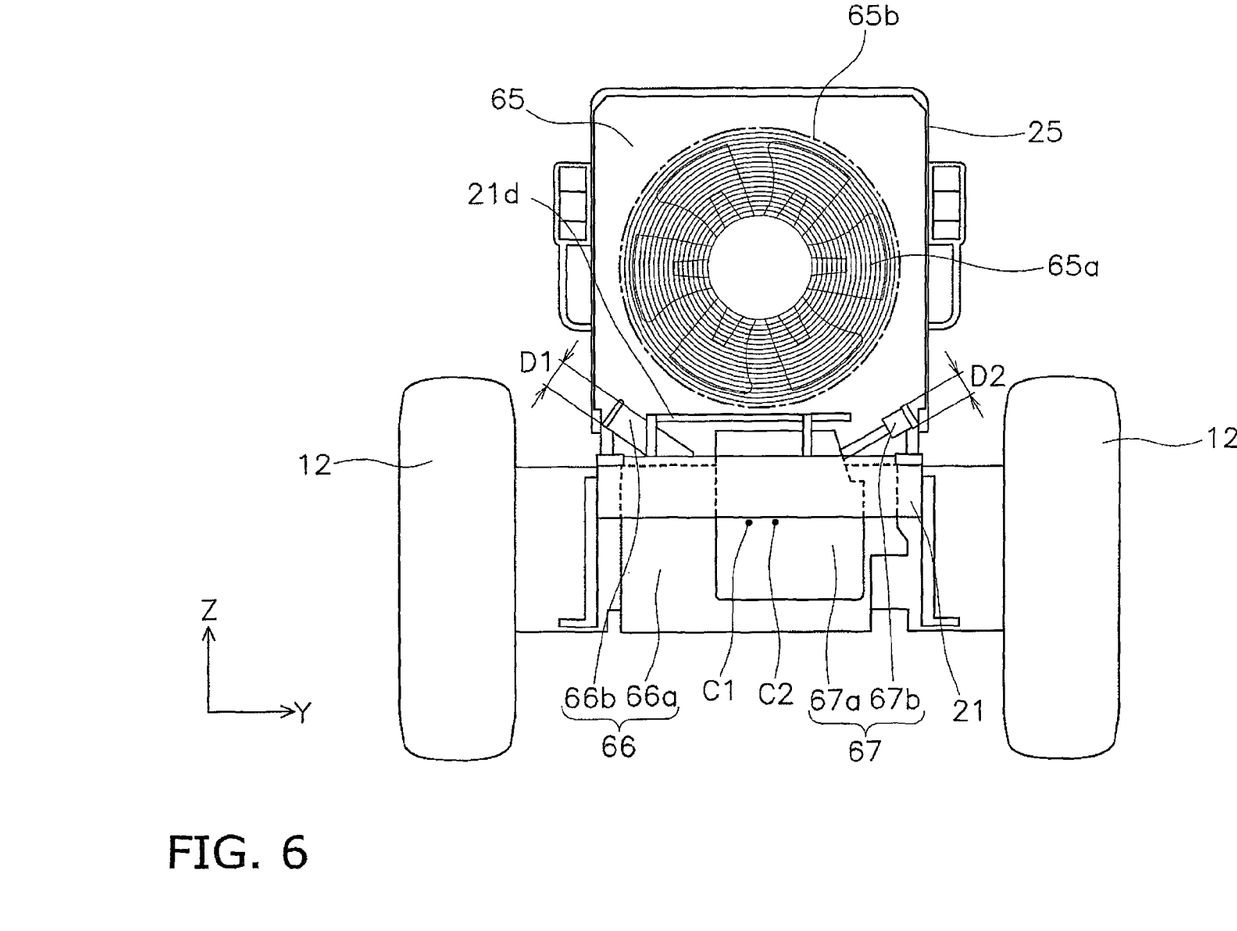
FIG. 6 illustrates a rear view of an engine compartment.

FIG. 3 illustrates a right side view of the internal configuration of an engine compartment. FIG. 4 illustrates an enlarged view of the vicinity of a post-treatment unit 8 (which will be described in detail later) in FIG. 3. FIG. 5 illustrates a top view of the internal configuration of the engine compartment. FIG. 6 illustrates a rear view of the engine compartment. In FIG. 3, for convenience of description, the outlines of the rear section frame 21, the outer cover 25, and the rearmost wheels 12a on the right side of the vehicle are shown by a two-dot chain line. In FIG. 5, for convenience of description, only the rearmost wheels 12a on the right side is shown in the diagram. In FIG. 5, the rearmost wheels 12a on the left side is arranged so as to be line symmetrical to the wheel shown in the diagram with regard to a center axis line C1 of the work vehicle 1 extending in the vehicle front and back direction. In FIG. 5, the outlines of the outer cover 25 and a hydraulic oil tank 101 which will be described later are shown by a two-dot chain line and the outlines of a first post-treatment apparatus 91 and a reducing agent tank 67 which will be described later are shown by a dotted line.

As shown in FIG. 3 and FIG. 5, the engine 61, a power transmission apparatus 7, a radiator 65, the post-treatment unit 8, the hydraulic oil tank 101, and the like are arranged in the engine compartment 6. A fuel tank 66 and the reducing agent tank 67 are arranged below these components. In other words, the fuel tank 66 and the reducing agent tank 67 are attached to the rear section frame 21. The engine compartment 6 is covered by the outer cover 25.

As shown in FIG. 3, the rear section frame 21 includes a first support section 21a and a second support section 21b with different heights in the vertical direction, and a tapered section 21c. The first support section 21a is higher than the second support section 21b in the vertical direction. The tapered section 21c is positioned between the first support section 21a and the second support section 21b. Here, the first support section 21a, the second support section 21b, and the tapered section 21c are arranged to be substantially left and right symmetrical at both the left and right sides of the rear section frame 21.

The outer cover 25 is attached to the rear section frame 21. The outer cover 25 covers the engine compartment. That is, the outer cover 25 is arranged above the engine 61, the first post-treatment apparatus 91 (refer to FIG. 4), a second post-treatment apparatus 92 (refer to FIG. 4), and the radiator 65.

Fuel retained in the fuel tank 66 is supplied to the engine 61. The engine 61 generates driving force by burning the fuel and transmits the driving force to a torque converter 62 and a hydraulic pump (which is not shown in the diagram). As shown in FIG. 3 and FIG. 5, the engine 61 is arranged in front of a center axis line Ayw of the shaft of the rearmost wheels 12a. A mounting bracket 70 is attached to the engine 61. The mounting bracket 70 is attached to the rear section frame 21 through dampers 73 and 74 (refer to FIG. 5). In more detail, the mounting bracket 70 is attached to the first support section 21a through the dampers 73 and 74. Accordingly, the mounting bracket 70 supports the engine 61 and links the engine 61 and the rear section frame 21 (that is, the vehicle frame 2). In other words, the mounting bracket 70 and the engine 61 are elastically supported by the first support section 21a. That is, the mounting bracket 70 and the engine 61 are elastically supported by the rear section frame 21.

The power transmission apparatus 7 includes the torque converter 62 and a transmission 63. The torque converter 62 and the transmission 63 are arranged below the hydraulic oil tank 101. Flanges 63a and 63b (refer to FIG. 5) are attached to the transmission 63. The flange 63a is attached to the rear section frame 21 through dampers 79a and 79b. The flange 63b is attached to the rear section frame 21 through dampers 79c and 79d (refer to FIG. 5). In more detail, the flanges 63a and 63b are attached to the first support section 21a though the dampers 79a to 79d. In other words, the torque converter 62 and the transmission 63 are elastically supported by the first support section 21a. That is, the torque converter 62 and the transmission 63 are elastically supported by the rear section frame 21.

The torque converter 62 is connected to the output side of the engine 61. The transmission 63 is connected to the output side of the torque converter 62. The transmission 63 includes a hydraulic-type clutch, transmission gears, and the like (which are not shown in the diagram) inside the transmission 63. The transmission 63 converts the rotational speed and torque of its input shaft which is connected to the output side of the torque converter 62. The converted rotational speed and torque are eventually transmitted from an output shaft of the transmission 63 to the rear wheels 12 via a final reduction gear and tandem apparatus (which are not shown in the diagram). The vehicle moves due to the rotational driving of the rear wheels 12.

A hydraulic pump (which is not shown in the diagram) is provided to accompany the transmission 63. The hydraulic pump drives each type of clutch of the transmission 63, the hydraulic motor 49, and each type of cylinder 44 to 48 using the hydraulic pressure of hydraulic oil retained in the hydraulic oil tank 101.

The radiator 65 cools cooling water in the engine 61. Here, the radiator 65 is provided behind the engine 61 and the post-treatment unit 8 in the vehicle. In other words, the engine 61 and the post-treatment unit 8 are provided in front of the radiator 65 in the vehicle. The radiator 65 is supported by the second support section 21b. That is, the radiator 65 is supported by the rear section frame 21 at a position which is lower than a position which is supported by the mounting bracket 70.

Internal Configuration of Post-treatment Unit 8

Next, the details of the post-treatment unit 8 will be described. As shown in FIG. 4, the post-treatment unit 8 includes a post-treatment apparatus support bracket 80, the first post-treatment apparatus 91, the second post-treatment apparatus 92, and a second connecting pipe 93. In addition, the work vehicle 1 is further provided with a first connecting pipe 69 and an exhaust pipe 26. The first connecting pipe 69 is a pipe for feeding exhaust of the engine 61 to the post-treatment unit 8. The first connecting pipe 69 connects the engine 61 and the first post-treatment apparatus 91. The exhaust pipe 26 is a pipe for discharging exhaust, which is processed in the post-treatment unit 8, from the engine 61.

In the present embodiment, the first post-treatment apparatus 91 is, for example, a diesel particulate filter apparatus and treats the exhaust from the engine 61 which is fed via the first connecting pipe 69. The first post-treatment apparatus 91 captures particulate matter included in the exhaust using a filter. The first post-treatment apparatus 91 incinerates the captured particulate matter using a heater installed in the filter.

As shown in FIG. 5, the first post-treatment apparatus 91 is positioned in front of the radiator 65. As shown in FIG. 4 and FIG. 5, the first post-treatment apparatus 91 has a substantially cylindrical outline. As shown in FIG. 5, the first post-treatment apparatus 91 is arranged such that a center axis Ay1 thereof is along the vehicle width direction.

As shown in FIG. 4, the first post-treatment apparatus 91 includes a first connection port 91a and a second connection port 91b. The first connecting pipe 69 is connected to the first connection port 91a. The second connecting pipe 93 is connected to the second connection port 91b.

The first connection port 91a protrudes obliquely upward. Specifically, the first connection port 91a protrudes obliquely upward and toward the engine 61 side. In contrast to this, the first connecting pipe 69 extends obliquely downward toward the first post-treatment apparatus 91 from a connection position with the engine 61. As a result, the highest position of the first post-treatment apparatus 91 is lower than the highest position of the engine 61. In addition, the first post-treatment apparatus 91 is arranged at a position which does not overlap with the engine 61 in top view. That is, at least one of the first post-treatment apparatus 91 and the second post-treatment apparatus 92 is arranged at a position which does not overlap with the engine 61 in top view.

The second connection port 91b is inclined slightly toward the rear from the vertical direction. As a result, as shown in FIG. 5, a center axis Ay3 of a linear section 93b (which is described in detail later) of the second connecting pipe 93 is positioned slightly behind the center axis Ay1 of the first post-treatment apparatus 91 in top view.

The second connecting pipe 93 is a relay connecting pipe which connects the first post-treatment apparatus 91 and the second post-treatment apparatus 92. As shown in FIG. 4, the outer diameter of the second connecting pipe 93 is smaller than the outer diameter of the first post-treatment apparatus 91. One end of the second connecting pipe 93 is connected to the second connection port 91b of the first post-treatment apparatus 91. The other end of the second connecting pipe 93 is connected to a third connection port 92a of the second post-treatment apparatus 92. The second connecting pipe 93 is arranged in the vicinity of the first post-treatment apparatus 91 above the first post-treatment apparatus 91.

As shown in FIG. 5, the second connecting pipe 93 includes a first curved portion 93a, the linear section 93b, and a second curved portion 93c. The linear section 93b is positioned above the first post-treatment apparatus 91. As shown in FIG. 5, the linear section 93b is arranged such that the center axis Ay3 is along the vehicle width direction. That is, the linear section 93b is arranged such that the center axis Ay3 is parallel to the center axis Ay1 of the first post-treatment apparatus 91. The first curved portion 93a links the linear section 93b and the second connection port 91b. The second curved portion 93c links the linear section 93b and the third connection port 92a of the second post-treatment apparatus 92. A reducing agent ejection apparatus 94 is attached to the first curved portion 93a. The reducing agent ejection apparatus 94 ejects the reducing agent inside the second connecting pipe 93. The reducing agent is, for example, aqueous urea.

In the present embodiment, the second post-treatment apparatus 92 is, for example, a selective catalytic reduction apparatus. The second post-treatment apparatus 92 uses the reducing agent to treat the exhaust from the engine 61 which is treated by the first post-treatment apparatus 91. The second post-treatment apparatus 92 selectively reduces nitrogen oxide NOx.

The second post-treatment apparatus 92 has a substantially cylindrical outline. As shown in FIG. 5, the second post-treatment apparatus 92 is arranged such that a center axis Ay2 thereof is along the vehicle width direction. In addition, the second post-treatment apparatus 92 is arranged such that the center axis Ay2 is parallel to the center axis Ay1 of the first post-treatment apparatus 91.

As shown in FIG. 3, the second post-treatment apparatus 92 is positioned in front of the radiator 65. In more detail, the second post-treatment apparatus 92 is arranged to be laterally adjacent to the second connecting pipe 93. In addition, as described above, the diameter of the second connecting pipe 93 is smaller than the diameter of the first post-treatment apparatus 91, and the center axis Ay3 of the linear section 93b of the second connecting pipe 93 is positioned slightly behind the center axis Ay1 in top view. As a result, the second post-treatment apparatus 92 is arranged to overlap with a portion of the first post-treatment apparatus 91 in top view. In addition, the second post-treatment apparatus 92 is arranged so as to overlap with a portion of the engine 61 in top view.

The second post-treatment apparatus 92 is arranged such that the highest position thereof is as high as or lower than the highest position of the radiator 65. In addition, the highest position of the first post-treatment apparatus 91 is lower than the highest position of the second post-treatment apparatus 92. Accordingly, both the highest position of the first post-treatment apparatus 91 and the highest position of the second post-treatment apparatus 92 are as high as or lower than the highest position of the radiator 65. Accordingly, as shown in FIG. 3, an upper surface 25a of the outer cover 25 can be set horizontally. Therefore, it is possible to realize excellent rear visibility.

As shown in FIG. 4 and FIG. 5, the second post-treatment apparatus 92 includes the third connection port 92a and a fourth connection port 92b. The second connecting pipe 93 is connected to the third connection port 92a. The exhaust pipe 26 is connected to the fourth connection port 92b. That is, the exhaust pipe 26 is connected to the second post-treatment apparatus 92.

The third connection port 92a is inclined slightly downward from the horizontal direction. Accordingly, as shown in FIG. 3, the center axis Ay3 of the linear section 93b of the second connecting pipe 93 is positioned slightly below the center axis Ay2 of the second post-treatment apparatus 92 in the vertical direction.

The fourth connection port 92b protrudes obliquely upward. Specifically, the fourth connection port 92b protrudes upward and obliquely toward the engine 61 side. Due to this, the exhaust pipe 26 protrudes obliquely upward above the engine 61. As a result, the outer cover 25 can be lowered, as compared to a case in which the fourth connection port 92b protrudes exactly upward, thus an air cleaner, which is not shown in the diagram, can be arranged between the exhaust pipe 26 and the engine 61. The upper portion of the exhaust pipe 26 protrudes upward from the outer cover 25.

The engine 61, the first connecting pipe 69, the first post-treatment apparatus 91, the second connecting pipe 93, the second post-treatment apparatus 92, and the exhaust pipe 26 are connected in series in this order. Accordingly, the exhaust from the engine 61 passes through the first connecting pipe 69 and is fed to the first post-treatment apparatus 91. In the first post-treatment apparatus 91, the particulate matter is mostly reduced from the exhaust. Next, the exhaust passes through the second connecting pipe 93 and is fed to the second post-treatment apparatus 92. In the second post-treatment apparatus 92, the NOx is mostly reduced. Thereafter, the exhaust gas which has been cleaned passes through the exhaust pipe 26 and is discharged to the outside.

Support Member of Post-treatment Unit 8

Next, the manner in which each of the components of the post-treatment unit 8 is supported will be described. As shown in FIG. 3, the post-treatment unit 8 is detachably mounted on the mounting bracket 70 at one end (the rear end) of the mounting bracket 70. In other words, the post-treatment unit 8 is supported by the mounting bracket 70 at one end (the rear end) of the mounting bracket 70. In more detail, the post-treatment apparatus support bracket 80 is supported on the mounting bracket 70 at one end of the mounting bracket 70. In addition, the post-treatment unit 8 is elastically supported by the first support section 21a. That is, the post-treatment unit 8 is elastically supported by the rear section frame 21. Accordingly, the post-treatment unit 8 vibrates integrally with the engine 61.

In addition, as described above, the torque converter 62 and the transmission 63, the torque converter 62 and the engine 61, the engine 61 and the mounting bracket 70, and the mounting bracket 70 and the post-treatment unit 8 are connected to each other, and the components of them are all connected to the rear section frame 21 via the dampers 79a to 79d, 73, and 74. Accordingly, the torque converter 62, transmission 63, the engine 61, and the post-treatment unit 8 vibrate integrally and are not easily affected by the vibration from the rear section frame 21.

As shown in FIG. 4, the post-treatment apparatus support bracket 80 includes a lower bracket 81, an upper bracket 87, and an anti-sway component 89. The post-treatment apparatus support bracket 80 is positioned in front of the radiator 65.

An opening section (which is not shown in the diagram) is formed in the lower bracket 81. Another motion apparatus, which is not shown in the diagram, can be provided in an opening section via a PTO (power take off) pump, which is not shown in the diagram.

The lower bracket 81 has a stepped shape which includes an upper step section and a lower step section. In addition, as shown in FIG. 4, the upper step section is arranged so that the upper step section is positioned in a position which is closer to the engine 61 than the lower step section in top view. A lower support section which supports the first post-treatment apparatus 91 is provided in the lower step section. An upper support section which supports the second post-treatment apparatus 92 is provided in the upper bracket. The upper support section and the lower support section are different in terms of height from the connection position with the mounting bracket 70. In more detail, the upper support section is higher than the lower support section. Furthermore, as shown in FIG. 4, the upper support section is positioned at a position which is closer to the engine 61 than the lower support section in top view.

The anti-sway component 89 is attached to a side surface of the upper step section on the engine 61 side. The anti-sway component 89 is connected to the engine 61 and links the upper portion of the engine 61 and the upper step section. Since the post-treatment unit 8 has a heavy object on the upper portion thereof, the upper portion of the post-treatment unit 8 can easily vibrate considerably, in particular in the front and back direction, due to vibration of the mounting bracket 70. The anti-sway component 89 is fixed to the upper portion of the engine 61, so that the anti-sway component 89 reduces vibration of the upper portion of the post-treatment unit 8 in the front and back direction.

Pipe for Reducing Agent and Structural Characteristics of Reducing Agent Tank

The reducing agent which is ejected by the reducing agent ejection apparatus 94 is retained in the reducing agent tank 67. As shown in FIG. 3 and FIG. 5, the reducing agent tank 67 includes a reducing agent tank body 67a and a reducing agent supply port 67b. The reducing agent tank body 67a retains the reducing agent used in the second post-treatment apparatus 92. The reducing agent supply port 67b of the reducing agent tank 67 supplies the reducing agent to the reducing agent tank body 67a. As described above, the reducing agent is, for example, aqueous urea. It is necessary to maintain the aqueous urea at a specific temperature range in order for the aqueous urea to be used as the reducing agent. It is preferable that the reducing agent tank 67 be arranged at a position which is separated from the engine 61 and the post-treatment apparatuses 91 and 92 such that it is hard to transfer heat from the engine 61 and the post-treatment apparatuses 91 and 92. Therefore, as shown in FIG. 3, the fuel tank 66 extends from below the engine 61 toward the rear of the vehicle and the reducing agent tank 67 is arranged behind the engine 61. In other words, the engine 61 is arranged in front of the center axis line Ayw of the shaft of the rearmost wheels 12a while the reducing agent tank 67 is arranged behind a rear end PR of the rearmost wheels 12a. In more detail, the reducing agent tank 67 is attached to a rear edge 21e of the vehicle frame. Accordingly, the reducing agent tank 67 is arranged behind the radiator 65. Furthermore, since the heat from the engine 61 is dissipated by the whole of the fuel tank 66 due to the fuel in the fuel tank 66, the reducing agent tank 67 being arranged behind the fuel tank 66 results in an effect where heat transmitted to the reducing agent tank 67 out of the heat from the engine 61 is reduced.

Figure 7:
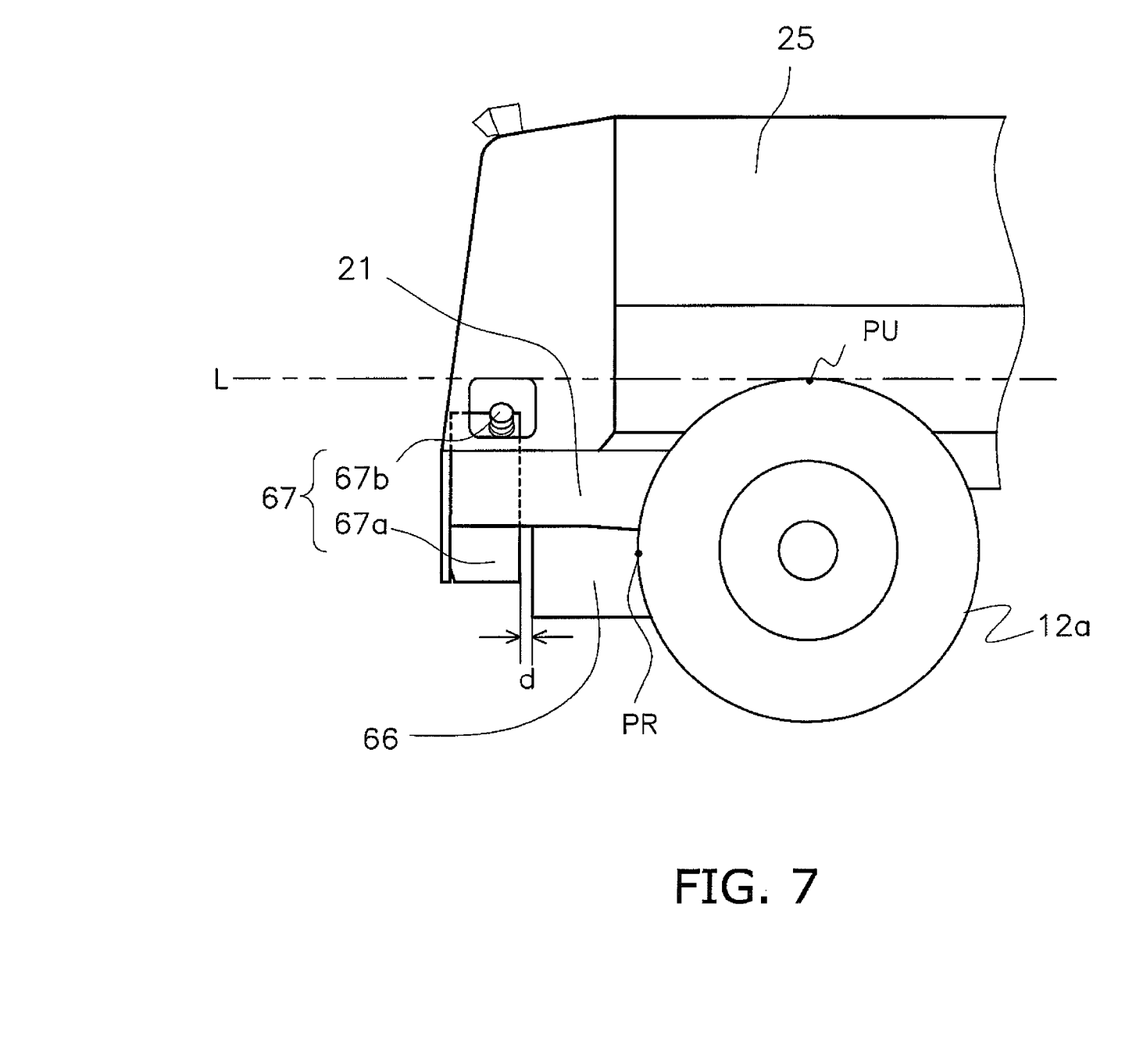
FIG. 7 illustrates an enlarged view of the vicinity of the rear edge of a work vehicle.

In addition, as shown in FIG. 3 and FIG. 7, the reducing agent tank 67 is arranged to be close to the fuel tank 66. Here, FIG. 7 illustrates an enlarged view of the vicinity of the rear edge of the work vehicle. Here, the reducing agent tank 67 is arranged to be separated from the fuel tank 66 in order to restrain heat from the fuel tank 66 which is received from the engine 61 from being conducted to the reducing agent tank 67. That is, a gap d (refer to FIG. 7) is provided between the reducing agent tank 67 and the fuel tank 66.

As shown in FIG. 5 and FIG. 6, a top plate 21d is provided above the reducing agent tank 67. Due to this, hot air from the radiator 65 does not directly hit the reducing agent tank 67 to restrain the reducing agent from being heated.

As shown in FIG. 3, FIG. 5, and FIG. 6, the fuel tank 66 includes a fuel tank body 66a and a fuel supply port 66b. The fuel tank body 66a retains fuel. The fuel supply port 66b of the fuel tank 66 supplies fuel to the fuel tank body 66a. The supply port 66b protrudes from the fuel tank body 66a toward a first direction which is a direction to either the left or right with regard to a center axis line C1 (refer to FIG. 5) extending in the front and back direction of the work vehicle 1 (vehicle body). The supply port 67b of the reducing agent tank 67 protrudes from the reducing agent tank body 67a toward a second direction which is a direction opposite to the first direction with regard to the center axis line C1. FIG. 3, FIG. 5, and FIG. 7 show a case where the first direction is the leftward direction and the second direction is the rightward direction, but the directions may be the reverse. Since the locations of the fuel supply port 66b and the reducing agent supply port 67b are significantly different, a user can clearly distinguish the fuel supply port 66b and the reducing agent supply port 67b.

As shown in FIG. 6, the supply port 66b of the fuel tank 66 and the supply port 67b of the reducing agent tank 67 protrude so as to be as further apart in the vehicle width direction as they extend upward. In addition, the diameter D1 of the fuel support port 66b is larger than the diameter D2 of the reducing agent support port 67b. As shown in FIG. 3 and FIG. 6, since the capacity of the fuel tank 66 is larger than the capacity for the reducing agent tank 67, the fuel supplying time can be shortened due to this.

As shown by FIG. 6, the supply port 66b of the fuel tank 66 and the supply port 67b of the reducing agent tank 67 are arranged inwards with respect to the outer cover 25, that is, the outer side surface of a vehicle body cover. Accordingly, as shown in FIG. 1 and FIG. 2, the reducing agent support port 67b is covered by a lid 67c which is a part of the vehicle body cover.

FIG. 7 illustrates an enlarged appearance of the vicinity of a rear edge of the work vehicle while the lid 67c is removed. As shown in FIG. 7, the supply port 67b of the reducing agent tank 67 does not overlap with a projection plane of the rearmost wheels 12a in a side view. Furthermore, the supply port 67b is positioned below a tangent line L which is tangent to the outer circumference of the rearmost wheels 12a at a top end PU of the rearmost wheels 12a. That is, the support port 67b is positioned below the top end PU of the rearmost wheels 12a. Due to this, the supply port 67a may not be arranged at a position which is high above the ground surface, which results in reducing the work load when the reducing agent is supplied.

As shown in FIG. 6, the radiator 65 includes a cooling fan 65a. The supply port 66b of the fuel tank 66 and the supply port 67b of the reducing agent tank 67 are outside the rotation region 65b of the cooling fan 65a viewed from the rear of the vehicle. Here, the rotation region 65b is indicated by a single dot line in FIG. 6.

As shown in FIG. 5 and FIG. 6, the reducing agent tank 67 is biased to the side of the supply port 67b. That is, a center C2 of the reducing agent tank 67 in the left and right direction is deviated in the second direction described above from the center axis C1 of the work vehicle 1 which extends in the front and back direction. In addition, in FIG. 3, FIG. 5, and FIG. 6, an appearance of the reducing agent tank having a substantially rectangular shape, the center of which in the left and right direction substantially matches with the position of the center of gravity, is illustrated. Accordingly, the position of the center of gravity C2 in the reducing agent tank 67 is deviated in the second direction from the center axis C1 of the work vehicle 1 which extends in the front and back direction. Consequently, the length of the pipe of the supply port 67b can be shortened.

Here, the reducing agent tank 67 may be provided with a sensor (which is not shown in the diagram) which detects whether or not liquid other than the reducing agent is retained in the reducing agent tank 67.

As shown in FIG. 3 and FIG. 4, the reducing agent is fed from the reducing agent tank 67 to the reducing agent ejection apparatus 94 through a supply pipe 98 and a drawing pump 98a. In order to restrain the heat from the engine 61 and the post-treatment apparatuses 91 and 92 from being conducted to the supply pipe 98, the work vehicle 1 is provided with a partition wall 68 in the engine compartment 6. The partition wall 68 is arranged between the supply pipe 98 and the post-treatment unit 8. The partition wall 68 is supported by the radiator 65 via a support member which is not shown in the diagram.

In addition, the outer cover 25 includes an air inlet port 25b (refer to FIG. 1 and FIG. 3) for drawing in outside air between the radiator 65 and the partition wall 68 in top view. The work vehicle 1 is provided with a protective cover 99 which covers the supply pipe 98 and the drawing pump 98a in the engine compartment 6 in order that the supply pipe 98 is not significantly cooled by the outside air which is drawn in and the cold air from the radiator 65.

Advantageous Effects

The work vehicle 1 according to the present embodiment is provided with the following features.

In the work vehicle 1, the supply port 66b of the fuel tank 66 and the supply port 67b of the reducing agent tank 67 are arranged at different left and right sides of the work vehicle. Accordingly, a user can clearly distinguish the supply port 66b of the fuel tank 66 and the supply port 67b of the reducing agent tank 67.

The diameter D1 of the supply port 66b of the fuel tank 66 is larger than the diameter D2 of the supply port 67b of the reducing agent tank 67. Since the capacity of the fuel tank 66 is larger than the capacity of the reducing agent tank 67, the fuel supplying time can be shortened due to this.

The supply port 66b of the fuel tank 66 and the supply port 67b of the reducing agent tank 67 protrude so as to be as further apart in the vehicle width direction as they extend upward. Due to this, the fuel which is supplied from the fuel supply port 66b naturally flows into the fuel tank body 66a. In the same manner, the reducing agent which is supplied from the reducing agent supply port 67b naturally flows into the reducing agent tank body 67a. This facilitates the fuel supplying work and the reducing agent supplying work.

The fuel tank 66 extends from below the engine 61 to the rear of the vehicle. Then, the reducing agent tank 67 is arranged behind the engine 61. This enables to enlarge the gap between the reducing agent tank 67 and the engine 61. In addition, since the heat from the engine 61 is dissipated by the whole of the fuel tank 66 due to the fuel in the fuel tank 66, the reducing agent tank 67 being arranged behind the fuel tank 66 results in an effect where heat transmitted to the reducing agent tank 67 out of the heat from the engine 61 is reduced. Therefore, it is difficult for heat which is generated by the engine 61 and the like to be transmitted to the reducing agent tank 67. As such, it is easy to maintain the reducing agent at a specific temperature range.

The reducing agent tank 67 is attached to the rear edge 21e of the vehicle frame. As such, the reducing agent tank 67 can be arranged as far from the engine 61 as possible. Accordingly, it is more difficult for heat which is generated by the engine 61 and the like to be transmitted to the reducing agent tank 67.

The reducing agent tank 67 is arranged to be close to the fuel tank 66. As a result, it is possible to arrange the supply port 66b of the fuel tank 66 and the supply port 67b of the reducing agent tank 67 at positions which are substantially left and right symmetrical with regard to the center axis line of the work vehicle 1 which extends in the vehicle front and back direction. As a result, the outer appearance of the work vehicle 1 is improved.

The center C2 of the reducing agent tank 67 in the left and right direction is deviated to either the left or right direction from the center axis C1 of the work vehicle which extends in the front and back direction. In more detail, the center C2 of the reducing agent tank 67 in the left and right direction may be deviated in the direction of the supply port 67b of the reducing agent tank 67 from the center axis line. In other words, the position of the center of gravity in the reducing agent tank is deviated to either the left or right direction from the center axis of the work vehicle which extends in the front and back direction. In more detail, the position of the center of gravity in the reducing agent tank may be deviated in the direction of the supply port 67b from the center axis line. This allows the length of the pipe of the supply port 67b to be shortened.

The reducing agent tank 67 is arranged to be separated from the fuel tank 66. That is, a gap is provided between the reducing agent tank 67 and the fuel tank 66. This restrains heat from the fuel tank 66 which is received from the engine 61 from being conducted to the reducing agent tank 67.

The support port 67b of the reducing agent tank 67 is positioned below the top end PU of the rearmost wheels 12a. Due to this, the workload for the reducing agent supplying is reduced since it is possible to lower the height of the support port 67b from the ground surface. Furthermore, the support port 67b does not overlap with a projection plane of the rearmost wheels 12a in side view. This facilitates the work of inserting a reducing agent supply nozzle into the supply port 67b in the reducing agent supply work.

The support port 67b of the reducing agent tank 67 is arranged inwards with respect to the outer side surface of the outer cover 25 (the vehicle body cover). This enables to prevent interference of obstacles with the supply port 67b. In addition, the outer appearance of the work vehicle 1 is made more attractive.

The support port 67b of the reducing agent tank 67 is outside the rotation region 65b of the cooling fan 65a in the radiator 65 viewed from the rear of the vehicle. This prevents the considerable warming of the reducing agent via the support port 67b due to warm air from the cooling fan 65a.

The reducing agent tank 67 is provided with a sensor (which is not shown in the diagram) which detects whether or not liquid other than the reducing agent is retained in the reducing agent tank 67. This prevents the intrusion of liquids other than the reducing agent into the reducing agent tank 67.

Modified Examples

Above, an embodiment of the present invention has been described but the present invention is not limited to the embodiment described above and various modifications are possible in a scope which does not depart from the gist of the invention.

The reducing agent tank 67 is arranged inside the vehicle frame and inwards with respect to the rear edge 21e of the vehicle frame, but may be arranged outside the vehicle frame and outwards with respect to the rear edge 21e of the vehicle frame. By doing this, it is possible to arrange the reducing agent tank 67 to be further from the engine 61.

Industrial Applicability

According to the present invention, it is possible to provide a work vehicle where a user can clearly distinguish between the fuel supply port and the reducing agent supply port while providing a function of treating nitrogen oxide (NOx) in the exhaust with the reducing agent.

The invention claimed is:

1. A work vehicle comprising:
an engine,
a selective catalytic reduction apparatus configured to treat exhaust from the engine;
a fuel tank including
a fuel tank body configured to retain fuel and
a fuel supply port configured to supply fuel to the fuel tank body; and
a reducing agent tank including
a reducing agent tank body configured to retain a reducing agent used in the selective catalytic reduction apparatus and
a reducing agent supply port configured to supply the reducing agent to the reducing agent tank body,
the fuel supply port protruding from the fuel tank body toward a first direction left or right with respect to a center axis line in a front and back direction of the work vehicle, and
the reducing agent supply port protruding from the reducing agent tank body toward a second direction opposite to the first direction with respect to the center axis line in the front and back direction of the work vehicle.

2. The work vehicle according to claim 1, wherein
the fuel supply port and the reducing agent supply port protrude so as to be further apart in a vehicle width direction as the fuel supply port and the reducing agent supply port extend upward.

3. The work vehicle according to claim 2, further comprising:
a vehicle frame,
the fuel tank being attached to the vehicle frame and extending from below the engine toward a rear of the work vehicle, and
the reducing agent tank being arranged to be adjacent to the fuel tank behind the fuel tank and being attached to the vehicle frame.

4. The work vehicle according to claim 2, further comprising:
a vehicle body cover accommodating the engine and the selective catalytic reduction apparatus,
the reducing agent supply port being arranged inward with respect to an outer side surface of the vehicle body cover.

5. The work vehicle according to claim 2, further comprising:
a radiator including a cooling fan,
the reducing agent supply port being outside a rotation region of the cooling fan viewed from a rear of the work vehicle.

6. The work vehicle according to claim 2, wherein
the reducing agent tank includes a sensor inside the reducing agent tank, and the sensor is arranged to detect whether liquid other than the reducing agent is retained in the reducing agent tank.

7. The work vehicle according to claim 1, wherein
a diameter of the fuel supply port is larger than a diameter of the reducing agent supply port.

8. The work vehicle according to claim 7, further comprising:
a vehicle frame,
the fuel tank being attached to the vehicle frame and extending from below the engine toward a rear of the work vehicle, and
the reducing agent tank being arranged to be adjacent to the fuel tank behind the fuel tank and being attached to the vehicle frame.

9. The work vehicle according to claim 7, further comprising:
a vehicle body cover accommodating the engine and the selective catalytic reduction apparatus,
the reducing agent supply port being arranged inward with respect to an outer side surface of the vehicle body cover.

10. The work vehicle according to claim 7, further comprising:
a radiator including a cooling fan,
the reducing agent supply port being outside a rotation region of the cooling fan viewed from a rear of the work vehicle.

11. The work vehicle according to claim 7, wherein
the reducing agent tank includes a sensor inside the reducing agent tank, and the sensor is arranged to detect whether liquid other than the reducing agent is retained in the reducing agent tank.

12. The work vehicle according to claim 1, further comprising:
a vehicle frame,
the fuel tank being attached to the vehicle frame and extending from below the engine toward a rear of the work vehicle, and
the reducing agent tank being arranged to be adjacent to the fuel tank behind the fuel tank and being attached to the vehicle frame.

13. The work vehicle according to claim 12, wherein
the reducing agent tank is attached to a rear edge of the vehicle frame.

14. The work vehicle according to claim 12, wherein
the reducing agent tank is arranged to be separated from the fuel tank.

15. The work vehicle according to claim 12, further comprising:
a plurality of wheels provided on the vehicle frame,
the plurality of wheels including rearmost wheels positioned farthest to the rear of the work vehicle, and
the reducing agent supply port being positioned below an upper edge of the rearmost wheels.

16. The work vehicle according to claim 15, wherein
the reducing agent supply port does not overlap with a projection plane of the rearmost wheels in a side view.

17. The work vehicle according to claim 1, further comprising:
a vehicle body cover accommodating the engine and the selective catalytic reduction apparatus,
the reducing agent supply port being arranged inward with respect to an outer side surface of the vehicle body cover.

18. The work vehicle according to claim 1, further comprising:
a radiator including a cooling fan,
the reducing agent supply port being outside a rotation region of the cooling fan viewed from a rear of the work vehicle.

19. The work vehicle according to claim 1, wherein
the reducing agent tank includes a sensor inside the reducing agent tank, and the sensor is arranged to detect whether liquid other than the reducing agent is retained in the reducing agent tank.

* * * * *